Patented Dec. 14, 1943

2,336,907

UNITED STATES PATENT OFFICE 2,336,907

SULPHONAMIDE DERIVATIVES OF UREA AND THIOUREA

Philip S. Winnek, Riverside, Conn., assignor to American Cyanamid Company, New York, N. Y., a corporation of Maine No Drawing. Application February 10, 1942, Serial No. 430,244

11 Claims. (Cl. 260—397.7)

This invention relates to a new class of chemical compounds and methods for their preparation. More particularly it relates to sulphonamide derivatives of urea and thiourea.

Of particular interest in the present invention are the compounds represented by the following formula and salts thereof:

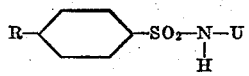

in which R represents amino or a substituted radical, such as alkylamino, arylamino, aralkylamino, and the like, or a radical convertible into an amino group including radicals such as nitro, acylamino, halogen, and azo radicals, and U represents urea or a thiourea radical.

These compounds are useful in a number of different industrial fields. Some of them are bacteriostatic and hence may be used as chemotherapeutic agents. The compounds having a free amino group are valuable as intermediates for the production of azo dyes and antiseptics. Similarly the compounds having an unsubstituted amino group may be condensed with formaldehyde to produce a novel class of thermosetting resinous materials.

In general, the preferred compounds of the present invention may be prepared by reacting a p-X-benzene sulphonyl halide with semicarbazide or thiosemicarbazide in which the X is a radical convertible into an amino group. Therefore, X may be a radical such as nitro, acylamino, halogen, or an azo radical. For example, an N-acyl sulphanilyl halide, when reacted with semicarbazide, yields N⁴-acyl sulphanilamido urea which may be converted by hydrolysis to the p-amino compound; or by starting with a p-nitrobenzene sulphonyl halide the p-nitrobenzene sulphonamido urea is obtained which may be reduced to give sulphanilamido urea. Starting with a p-halogen benzene sulphonyl halide, the resulting p-halogen benzene sulphonamido urea compound may be converted to sulphanilamido urea by treatment with ammonia. In all these reactions, when thiosemicarbazide is employed, the corresponding sulphanilamido thiourea compounds are obtained. Preferably the reaction between the p-X-benzene sulphonyl halide is carried out in an organic liquid medium, such as for example dioxane, isopropyl alcohol, tertiary butyl alcohol, dioxane, or the like. In this reaction a hydrogen halide is liberated and in most instances it is desirable to provide a basic reaction medium which will unite with the hydrogen halide evolved. This may be effected by carrying out the reaction in a suitable medium and adding excess of sodium hydroxide or other alkali hydroxide. In the preferred process the reaction is carried out in the presence of a basic reaction medium such as pyridine, quinoline, or triethylamine, and in which case it is not necessary to add an alkali hydroxide.

Of the various starting compounds, the acyl sulphanilyl halides are perhaps the most useful as they are the most readily obtainable and subsequent hydrolysis of the acylamino group to an amino group is one which is very easily carried out. Next in importance as starting materials are the p-nitrobenzene sulphonyl halides which result in the production of p-nitrobenzene sulphonylamido urea or p-nitrobenzene sulphonylamido thiourea and which compounds may be readily reduced by ordinary methods to the corresponding p-amino derivative. For most purposes the sulphanilamido urea and sulphanilamidothiourea may be used interchangeably since they differ only very slightly in structure and their usefulness is not primarily controlled by whether or not the urea portion is urea itself or thiourea.

The invention will be described in greater detail in conjunction with the following specific examples, which however, are merely illustrative of the preferred methods of preparing representative compounds of the class and are not intended to limit the scope of the invention. The parts are by weight except in the case of liquids which are expressed in corresponding parts by volume.

EXAMPLE 1

Six parts of semicarbazide hydrochloride are suspended in 15 parts of anhydrous pyridine. 12.5 parts of acetylsulphanilyl chloride are added gradually with vigorous stirring and with the temperature kept between 35°–40° C. The reaction mixture is warmed to 50° C. for fifteen minutes. It is then cooled and 250 parts of water are added. The crude N⁴-acetylsulphanilamido urea separates as a light yellow solid. It is purified by crystallization from acetic acid.

EXAMPLE 2

Sulphanilamido urea

Ten parts of N⁴-acetylsulphanilamido urea are suspended in a mixture of 200 parts of 95% ethyl alcohol and 40 parts of concentrated hydrochloric acid. The mixture is heated to boiling under reflux and heating is continued for twenty minutes after all the solid material has dissolved. The solution is then diluted with 500 parts of cold water and stirred with decolorizing charcoal for fifteen minutes. The mixture is filtered and the filtrate neutralized in the cold with 20% sodium hydroxide solution. The crude sulfanilamido urea separates as a light yellow solid. It is purified by crystallization from hot water using activated charcoal to remove impurities. The product is a white crystalline material.

EXAMPLE 3

*p-Nitrobenzene sulphonylamido urea*

Six parts of semicarbazide hydrochloride are suspended in 15 parts of anhydrous pyridine. 12 parts of p-nitrobenzenesulphonyl chloride are added gradually with vigorous stirring and with the temperature kept at 35°–45° C. The reaction mixture is warmed to 50° C. for fifteen minutes. It is then cooled and 250 parts of water are added. The crude p-nitrobenzene sulphonylamido urea separates as a yellow solid. It is purified by crystallization from acetic acid. On reduction of the p-nitrobenzene sulphonylamido urea with iron dust and acetic acid, sulphanilamido urea is obtained identical with the product obtained in Example 2.

EXAMPLE 4

*$N^4$-Acetylsulphanilamido thiourea*

4.6 parts of thiosemicarbazide are suspended in 13 cc. of anhydrous pyridine and 13 parts of acetylsulphanilyl chloride are added gradually with vigorous stirring and with the temperature maintained at 40°–45° C. The reaction mixture is then stirred and warmed to 50°–60° C. for one hour. After cooling 200 parts of water are added. The crude $N^4$-acetylsulphanilamido thiourea separates as a yellow solid. It is purified by crystallization from acetic acid.

EXAMPLE 5

*Sulphanilamido thiourea*

Five parts of $N^4$-acetylsulphanilamido thiourea are suspended in 100 parts of 95% ethyl alcohol and 20 parts of concentrated hydrochloric acid. The mixture is heated to boiling under reflux. The solid dissolves and boiling is continued twelve minutes after solution is complete. It is cooled, diluted with an equal volume of water and stirred for one-half hour with activated charcoal. The mixture is filtered and the filtrate is neutralized in the cold with sodium hydroxide. The sulphanilamidothiourea separates as a white solid. It is purified by crystallization from aqueous alcohol.

The hydrogen of the sulphonamide group in the compounds of the examples is capable of reacting with strong bases to form salts. The alkali metal salts can be produced directly by a reaction of the compounds with an alkali metal hydroxide in concentrated aqueous solution. The salt can then be precipitated by adding an excess of solid alkali hydroxide and recrystallized from absolute alcohol. The salts are in general suitable for the same purposes as the parent compounds.

Salts of the heavy metals such as gold, copper, iron, and the like, can be obtained by a reaction of an aqueous solution of the alkali metal salts with a solution of the desired heavy metal salt. The salts of the heavy metals are either insoluble or have such a low degree of solubility that they readily precipitate out of the solution.

In the above examples the p-acetylamino benzene sulphonyl chloride was used in carrying out the reaction. The acetyl compound is preferred because of its cheapness and availability. However, it is to be understood that other acyl compounds may be used, and it is to be understood that the acyl group may be that of any organic carboxylic acid, including those such as propionyl, butyryl, benzoyl, nicotinyl, and the like. Similarly, instead of p-acetylaminobenzene sulphonyl chloride the corresponding p-acetylaminobenzene sulphonyl bromide may be used.

The sulphanilamido ureas or sulphanilamido thioureas will react readily with any inorganic or organic acid to form addition salts therewith. The ordinary inorganic acid addition salts, such as the hydrochlorides, sulphates, phosphates, chlorates, and the like, may be prepared by adding the sulphanilamido urea or sulphanilamido thiourea to a relatively strong aqueous solution of the acid. The salts produced by such reactions may be very conveniently recovered by diluting the aqueous solution with an organic solvent such as acetone and collecting the resulting precipitate by filtration. The acid addition salts of the water soluble organic acids, for example, acetic, lactic, mandelic, and the like, may be prepared as described in the processes above and in other cases the acid addition salts may be prepared by a method in which a relatively water insoluble organic acid, such as benzoic, is dissolved in an organic solvent, for example ethyl alcohol, and the sulphanilamido urea or sulphanilamido thiourea added to this solution. The salt may then be recovered from the solution. The salt may then be recovered from the solution by any convenient means, as for example by evaporating the solution to dryness. It is readily seen, therefore, that the present invention relates to and includes any inorganic acid salt or any organic acid salt of the various sulphanilamido ureas or sulphanilamido thioureas. The organic acid salts may be those produced from saturated or unsaturated carboxylic acids, saturated or unsaturated hydroxy carboxylic acids, as well as halogenated or other substituted or unsubstituted acids of the aliphatic, alicyclic, aromatic, or heterocyclic series. Preferably the salts are those produced from relatively non-toxic organic acids or those having some bactericidal or other therapeutic property including acids such as acetic, salicylic, mandelic, lactic, nicotinyl, p-aminobenzoic, and the like.

The above description and examples are intended to be illustrative only. Any modification or variation therefrom which conforms to the spirit of the invention is intended to be included within the scope of the claims.

What I claim is:

1. A compound of the group consisting of those represented by the following formula and salts thereof:

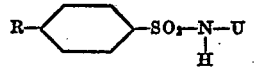

in which R is a member of the group consisting of amino radicals, radicals hydrolyzable to an amino group and radicals reducible to an amino group, and U is a member of the group consisting of urea and thiourea radicals.

2. The compounds represented by the following formula:

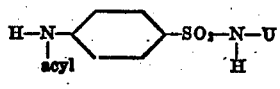

in which acyl is a radical of an organic carboxylic acid, and U is a member of the group consisting of urea and thiourea radicals.

3. The compounds represented by the following formula:

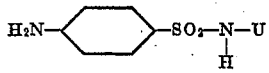

in which U is a member of the group consisting of urea and thiourea radicals.

4. The compound $N^4$-acetylsulphanilamido urea.

5. The compound sulphanilamido urea.

6. The compound sulphanilamido thiourea.

7. The process of producing sulphanilamido urea which comprises reacting semicarbazide hydrochloride, suspended in anhydrous pyridine, with p-acetylaminobenzene sulphonyl chloride to produce $N^4$-acetylsulphanilamido urea and subsequently removing the $N^4$-acetyl group by hydrolysis.

8. The process of producing sulphanilamido thiourea which comprises reacting thiosemicarbazide hydrochloride, suspended in anhydrous pyridine, with p-acetylaminobenzene sulphonyl chloride to produce $N^4$-acetylsulphanilamido thiourea and subsequently removing the $N^4$-acetyl group by hydrolysis.

9. The process of producing compounds of the group consisting of p-X-benzenesulphanilamido ureas and p-X-benzenesulphanilamido thioureas which comprises reacting a p-X-benzene-$SO_2$-halogen with a member of the group consisting of semicarbazide and thiosemicarbazide and wherein X is a member of the group consisting of radicals hydrolyzable to an amino group and radicals reducible to an amino group.

10. A process for producing p-X-benzenesulphanilamido ureas which comprises reacting a p-X-benzene-$SO_2$-halogen with semicarbazide, in which X is a member of the group consisting of radicals hydrolyzable to an amino group and radicals reducible to an amino group.

11. A process for producing p-X-benzenesulphanilamido thioureas which comprises reacting a p-X-benzene-$SO_2$-halogen with thiosemicarbazide, in which X is a member of the group consisting of radicals hydrolyzable to an amino group and radicals reducible to an amino group.

PHILIP S. WINNEK.